United States Patent
Jeon

(10) Patent No.: US 9,841,796 B2
(45) Date of Patent: Dec. 12, 2017

(54) PREVENTING DARK CURRENT IN BATTERY MANAGEMENT SYSTEM

(71) Applicant: SAMSUNG ELECTRONICS CO., LTD., Suwon-si (KR)

(72) Inventor: Jinyong Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 14/789,363

(22) Filed: Jul. 1, 2015

(65) Prior Publication Data

US 2016/0162014 A1 Jun. 9, 2016

(30) Foreign Application Priority Data

Dec. 4, 2014 (KR) .................. 10-2014-0173009

(51) Int. Cl.
| | | |
|---|---|---|
| *G06F 1/26* | (2006.01) | |
| *H02M 5/25* | (2006.01) | |
| *G05F 1/45* | (2006.01) | |
| *G05F 1/44* | (2006.01) | |

(52) U.S. Cl.
CPC .................. *G06F 1/26* (2013.01); *G05F 1/44* (2013.01); *G05F 1/45* (2013.01); *H02M 5/25* (2013.01)

(58) Field of Classification Search
CPC ................................ H02M 3/156; G06F 1/26
USPC ........................................................ 323/282
See application file for complete search history.

(56) References Cited

U.S. PATENT DOCUMENTS

| | | | | |
|---|---|---|---|---|
| 4,557,579 A | * | 12/1985 | Nakajima | ................ G02B 7/36 396/129 |
| 4,710,699 A | * | 12/1987 | Miyamoto | ......... H03K 17/0824 323/246 |
| 8,660,751 B2 | | 2/2014 | Izutani et al. | |
| 2006/0055348 A1 | * | 3/2006 | Kifuku | .................. H02M 3/156 318/108 |
| 2014/0252861 A1 | * | 9/2014 | Zhou | ......................... H02J 4/00 307/64 |

FOREIGN PATENT DOCUMENTS

| | | |
|---|---|---|
| JP | 4693290 B2 | 3/2011 |
| JP | 2014-051144 A | 3/2013 |
| KR | 10-1999-002408 A | 1/1999 |
| KR | 10-2010-0055049 A | 5/2010 |
| KR | 10-2010-0062615 A | 6/2010 |
| KR | 10-2013-0030676 A | 3/2013 |
| KR | 10-2014-0031024 A | 3/2014 |
| KR | 10-2014-0061637 A | 5/2014 |
| KR | 10-2014-0085933 A | 7/2014 |

* cited by examiner

*Primary Examiner* — Jue Zhang
*Assistant Examiner* — Trinh Dang
(74) *Attorney, Agent, or Firm* — NSIP Law

(57) ABSTRACT

A method and apparatus for preventing dark current in a battery management system (BMS) are provided. A battery control apparatus may include a voltage regulator configured to regulate a voltage of a driving power supplied from a power supply to a processor, a first switch, located between the power supply and the voltage regulator, configured to switch on and off a connection between the power supply and the voltage regulator, and a second switch configured to control the first switch based on an input of a driving signal to operate the processor.

24 Claims, 9 Drawing Sheets

800

PREVENTING DARK CURRENT IN BATTERY MANAGEMENT SYSTEM

CROSS-REFERENCE TO RELATED APPLICATION(S)

This application claims the benefit under 35 USC 119(a) of Korean Patent Application No. 10-2014-0173009 filed on Dec. 4, 2014, in the Korean Intellectual Property Office, the entire disclosure of which is incorporated herein by reference for all purposes.

BACKGROUND

1. Field

The following description relates to techniques, methods, and apparatuses to prevent dark current in a battery management system (BMS).

2. Description of Related Art

As environmental concerns and energy resource issues become more important, electric powered vehicles have been touted as the vehicles of the future. The main power source of an electric power vehicle includes a battery formed in a single pack with a plurality of rechargeable and dischargeable secondary cells. As a result of using electricity to power the vehicle, the electric vehicle does not emit exhaust gas and produces less noise.

Recently, research is being conducted to increase battery life and control of a battery using a battery control apparatus. In addition, research is also being conducted regarding the stability of the battery and the battery control apparatus.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery control apparatus includes: a processor; a voltage regulator including an input and an output, the voltage regulator configured to receive power supplied from a power supply at the input, regulate the voltage of the power, and provided the regulated voltage to the output to power the processor; a first switch having a first state connecting the input of the voltage regulator to receive the power from the power supply and a second state disconnecting the input of the voltage regulator from the power supply to cut off the power from the input to the voltage regulator; and a second switch having an output connected to the first switch, the second switch configured to provide a control signal to the output to place the first switch in the one of the first state or the second state.

The first switch may include: a transistor connected to the second switch, the transistor being located between the power supply and the voltage regulator; and a resistor connected in parallel to the transistor.

The second switch may include an input configured to receive a power latch signal from the processor and a driving signal from the power supply and to output the control signal to place the first switch in the first state in response to receiving at least one of the driving signal and the power latch signal. The second switch may be configured to stop output of the control signal and place the first switch in the second state once a predetermined period of time elapses after the second switch ceases to receive the driving signal.

The processor may be configured to transmit the power latch signal to the second switch when the driving signal is not input to the processor for a period of time, the period of time being from a point in time when the driving power is provided to the processor to a point in time when the predetermined period of time elapses. The processor also may be configured to stop transmitting the power latch signal to the second switch, and the second switch is configured to place the first switch in the second state after the predetermined period of time elapses when the second switch stops receiving the driving signal and the power latch signal.

The processor may be configured to terminate a program being processed by the processor during the predetermined period of time. The processor also may be configured to set the predetermined period of time to be equal to or longer than a period of time required to terminate the program.

The second switch may include: an OR gate configured to transmit an output signal when receiving at least one of the driving signal and the power latch signal; and a transistor connected between the OR gate and the first switch, the transistor configured to place the first switch in the first state in response to the output signal provided from the OR gate.

The second switch may include: a first diode having an input and an output, the first diode configured transfer the driving signal received at the input of the first diode to the output of the first diode; a second diode having an input and an output, the second diode configured to transfer the power latch signal received at the input of the second diode to the output of the second diode; and a first transistor, connected to the output of the first diode and the output of the second diode, the first transistor configured to place the first switch in the first state and the second state, wherein the first transistor places the first switch in the second state when neither the driving signal is output from the first diode, nor the power latch signal is output from the second diode.

The second switch also may include a second transistor comprising an input configured to receive the driving signal and an output connected to the first diode, the second transistor configured to transfer the driving signal received at the input to the output.

The second switch may include: a transistor having an input, the transistor configured to receive a current at the input and place the first switch in the first state when the input receives the current and to place the first switch in the second state when the input stops receiving the current; and a capacitor configured to provide the current to the transistor for a predetermined period of time after the driving signal stops being transmitted to the second switch, wherein, the current provided to the transistor corresponds to the current provided by the driving signal. The capacitor may have a capacity enabling the capacitor to provide the current to the transistor for the predetermined period of time. The second switch also may include: a diode, connected between the transistor and the capacitor, configured to transfer the driving signal and the current from the capacitor to the transistor; and a resistor connected in parallel to the diode.

In another general aspect, a power management apparatus includes: a power providing unit configured to provide a driving power to a processor; and a power controller configured to control providing of the driving power by the power providing unit based on receiving an input of a driving signal to operate the processor.

The power providing unit may include a voltage regulator configured to regulate a voltage of the driving power input to the processor.

The power providing unit may be configured to provide the driving power to the processor in response to receiving at least one of an input of a power latch signal from the processor and the input of the driving signal.

The power controller may be configured to control the power providing unit to stop providing the driving power to the processor when a predetermined period of time elapses after the power controlling unit stops receiving input of the driving signal. The power controller also may be configured to receive an input of the power latch signal from the processor during the predetermined period of time after power controlling unit stops receiving input of the driving signal and control the power providing unit to stop providing the driving power to the processor when the input of the power latch signal is terminated.

The predetermined period of time may correspond to the time need by the processor to terminate a program being processed by the processor.

In another general aspect, a method of controlling a processor includes: receiving a driving power from a voltage regulator in response to a driving signal to operate the processor being input to a battery control apparatus comprising the processor; operating the processor using the received driving power; transmitting a power latch signal to a switch during a period from a point in time when the driving power is provided to the processor to a point in time when a predetermined period of time elapses after the input of the driving signal to the battery control apparatus is interrupted, the switch being configured to maintain a connection between a power supply and the voltage regulator in response to receiving at least one of the driving signal and the power latch signal; and interrupting transmission of the power latch signal to the switch in response to the predetermined period of time elapsing.

The method may further include preventing any power consumption by the processor in response to interruption of transmission of the power signal.

The method may further include: stop receiving the driving power from the voltage regulator to operate the processor from being input to a battery control apparatus comprising the processor; and stop operating the processor.

The method may further include terminating a program being processed by the processor during the predetermined period of time. The method also may further include setting the predetermined period of time to be equal to or longer than a period of time required to terminate the program.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
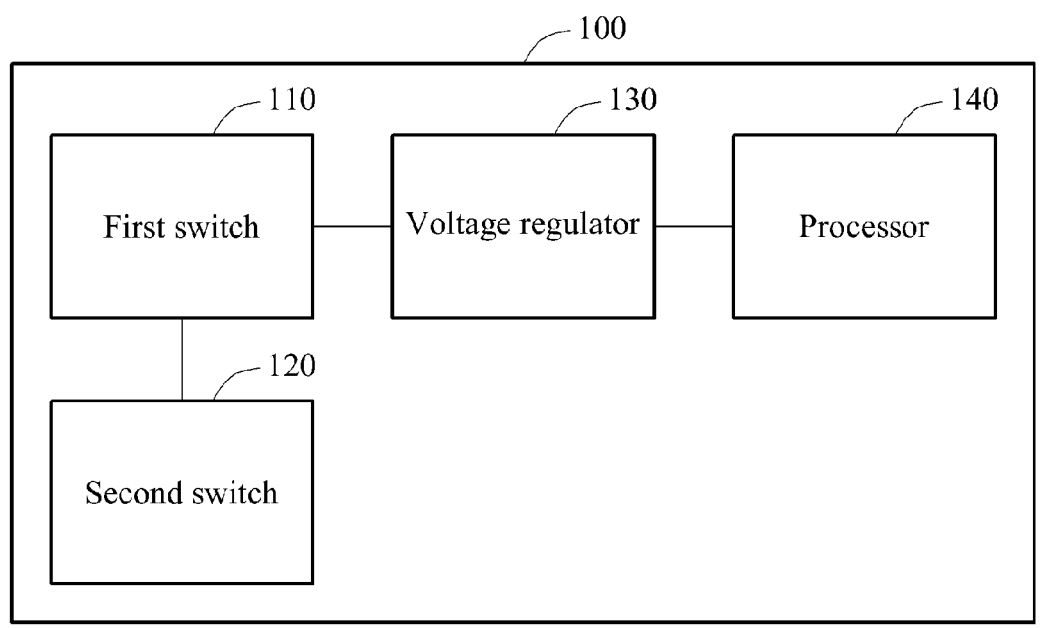
FIG. 1 is a block diagram illustrating an example of a battery control apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for overall conciseness and clarity.

The features described herein may be embodied in different forms, and are not to be construed as being limited to the examples described herein. Rather, the examples described herein have been provided so that this disclosure is thorough and complete, and conveys the full scope of the disclosure to one of ordinary skill in the art.

Various alterations and modifications may be made to the exemplary embodiments, some of which are illustrated in detail in the drawings and detailed description. However, it should be understood that these embodiments are not construed as limited to the illustrated forms and include all changes, equivalents or alternatives within the knowledge and the technical scope of this disclosure.

The terminology used herein is for the purpose of describing particular embodiments only and is not intended to limit the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with the context of the relevant art described herein and should not be interpreted in an idealized or overly formal sense, unless expressly so defined herein.

Hereinafter, exemplary embodiments are described in detail with reference to the accompanying drawings, wherein like reference numerals refer to like elements throughout. Therefore, redundant descriptions of like elements are omitted herein. Moreover, a detailed description of a related, known function or configuration may be omitted when it is determined that inclusion makes the description of the present invention unnecessarily cumbersome or ambiguous.

FIG. 1 is a block diagram illustrating an example of a battery control apparatus 100.

Referring to FIG. 1, the battery control apparatus 100 includes a first switch 110, a second switch 120, a voltage regulator 130, and a processor 140.

The battery control apparatus 100 controls a battery (not shown). In this example, the battery supplies power to a vehicle that includes the battery. The vehicle may be, for example, an electric vehicle (EV) or an electric cycle. The battery may include a plurality of battery modules. The plurality of battery modules may each include a plurality of cells. In one example, the plurality of cells are secondary batteries, for example, lithium ion batteries. Capacities of the plurality of cells may be the same as or different from each other.

The battery control apparatus 100 monitors a state of the battery and controls the battery. In one example, the battery control apparatus 100 may be a battery management system (BMS).

The battery control apparatus 100 performs thermal control of the plurality of battery modules in the battery. Additionally, the battery control apparatus 100 prevents overcharging and over-discharging of the plurality of battery modules. The battery control apparatus 100 also controls the plurality of battery modules such that the charge state of each module are equal. Accordingly, the battery control apparatus 100 may increase the energy efficiency of the plurality of battery modules and prevent a reduction in the life of the plurality of battery modules.

Additionally, the battery control apparatus 100 may detect a state of health (SoH), a state of charge (SoC), a state of function (SoF), and other parameters of the battery. For example, the SoH indicates a degree of degradation in the performance of the battery as compared to the performance of the battery during manufacture, the SoC indicates information about an amount of charge accepted by the battery, and the SoF indicates information about a degree to which the performance of the battery matches a predetermined condition.

The battery control apparatus 100 may provide the SoH, the SoC, and the SoF to an electronic control unit (ECU) (not shown). The battery control apparatus 100 may communicate with the ECU using a controller area network (CAN) communication (not shown).

The processor 140 controls the battery control apparatus 100. For example, the processor 140 controls the other units included in the battery control apparatus 100. The processor 140 may be implemented using, for example, a microcontroller unit (MCU).

The processor 140 operates when a driving power is supplied to the processor 140. When the driving power is absent, the processor 140 does not operate. For example, when an ignition switch of the vehicle is turned on, the driving power is supplied to the processor 140. When the ignition switch is turned off, the driving power is not supplied to the processor 140.

The voltage regulator 130 regulates a voltage of the driving power supplied by a power supply device to the processor 140. The power supply device (not shown) may be an external power source (for example, a lead storage battery) to continuously supply a driving power to the battery control apparatus 100. The power supply device also may be referred to as a "power supply." The power supply device may be located outside the battery control apparatus 100.

The voltage regulator 130 regulates the voltage of the driving power supplied from the power supply that is input to the processor 140. As a result, the driving power is provided to the processor 140 at the regulated voltage. For example, a voltage of 0 volt (V) to 5 V may be input to the processor 140. When the power supply supplies a driving power with a voltage greater than 5 V to the voltage regulator 130, the voltage regulator 130 regulates the voltage of the driving power to be equal to or less than 5 V. Accordingly, the voltage regulator 130 may transmit a voltage equal to or less than 5 V to the processor 140 to prevent an overvoltage from being input to the processor 140.

The first switch 110 switches a connection between the power supply and the voltage regulator 130 on and off in response to the control received from the second switch 120. The first switch 110 is located between the power supply and the voltage regulator 130.

The second switch 120 controls the first switch 110 based on an input of a driving signal to operate the processor 140. For example, the driving signal may be received from the ignition switch. When the ignition switch is turned on, the driving signal is transmitted to the battery control apparatus 100. When the ignition switch is turned off, the driving signal is not transmitted to the battery control apparatus 100.

In an example, the first switch 110 and the second switch 120 may each include a transistor. For example, the first switch 110 may include a transistor connected to the second switch 120 and a resistor connected in parallel with the transistor. The transistor may be, for example, a bipolar junction transistor (BJT), a field effect transistor (FET), or an insulated gate bipolar mode transistor (IGBT). However, according to one example, the first switch 110 may be implemented using, but not limited to, any apparatus capable of switching on and off the connection between the power supply and the voltage regulator 130, and the second switch 120 may be implemented using any apparatus capable of controlling the first switch 110 based on an input of a driving signal.

When a driving signal is received from the ignition switch, the second switch 120 turns on the first switch 110 to connect the power supply to the voltage regulator 130. Accordingly, the voltage regulator 130 may supply the driving power from the power supply to the processor 140. The processor 140 operates when the driving power is received.

When the driving signal is not received from the ignition switch, the second switch 120 turns off the first switch 110 to disconnect the power supply from the voltage regulator 130. When the power supply is disconnected from the voltage regulator 130, the driving power is not provided from the power supply to the battery control apparatus 100. Typically, a dark current refers to the leakage of current flowing from a voltage regulator when a power supply is connected to the voltage regulator. A higher value of the dark current has a direct influence on a use period of a system with a limited power supply, such as a battery. However, according to the above-described implementation, a dark current is prevented from being generated in the battery control apparatus 100.

Operation of the processor 140 may be interrupted when the power supply is disconnected from the voltage controller 130. When operation of the processor 140 is unexpectedly terminated because the power supply is disconnected, performance of the processor 140 may be reduced or the processor 140 may be damaged, depending on circumstances. Thus, the second switch 120 turns off the first switch 110 to disconnect the power supply from the voltage regulator 130 after a predetermined period of time elapses, even though the driving signal is not received. During the predetermined period of time, the processor 140 may perform a series of operations allowing normal termination of operation of the processor 140. Accordingly, operation of the processor 140 may be stably terminated even when providing of the driving power to the processor 140 is to be interrupted.

In an example, the operation, performed by the battery control apparatus 100, to delay cutoff of the supply of driving power to the processor 140 for a predetermined period of time in order to terminate the processor 140 stably may be referred to as a "power latch."

When a driving signal is not supplied to the second switch 120, the second switch 120 controls the first switch 110 to remain in an ON state for a predetermined period of time and thereby perform a power latch. For example, the battery control apparatus 100 may include a capacitor configured to provide a current to the second switch 120 for a predetermined period of time corresponding to the current of the driving signal. In this example, when the capacitor provides the current to the second switch 120 for the predetermined period of time, and the first switch 110 remains in the ON state for the predetermined period of time.

The processor 140 may receive an input of the driving signal from the ignition switch. To perform the power latch, the processor 140 transmits a power latch signal to the second switch 120 during the period from a point in time when the driving power is input to the processor 140 to a point in time when a predetermined period of time elapses after the input of the driving signal to the processor 140 is interrupted. The power latch signal refers to a signal having a power corresponding to that of the driving signal. The second switch 120 maintains the first switch 110 in the ON state while the power latch signal is being received. The second switch 120 controls the first switch 110 to be in the OFF state when the power latch signal is no longer received.

For example, when no driving signal is input to the processor 140, the processor 140 transmits a control signal to the second switch 120 to control the second switch 120 to turn off the first switch 110 after the predetermined period of time elapses and perform the power latch. The second switch 120 controls the first switch 110 to be in the OFF state in response to the control signal being received from the processor 140.

During the predetermined period of time of the power latch, the processor 140 may terminate a program being processed by the processor 140. In this example, the processor 140 may set the predetermined period of time to be equal to or longer than a period of time required to terminate the program properly.

Figure 2:
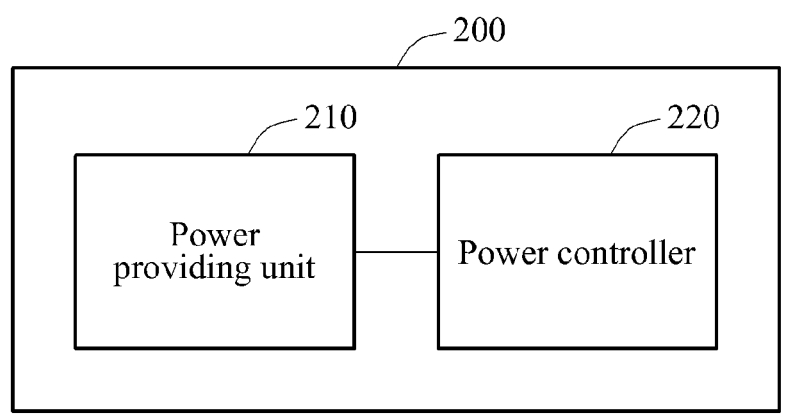
FIG. 2 is a block diagram illustrating an example of a power management apparatus.

FIG. 2 illustrates an example of a power management apparatus 200.

As shown in FIG. 2, the power management apparatus 200 includes a power providing unit 210 and a power controller 220. The power providing unit 210 provides a driving power to a processor configured to control a battery control apparatus. The processor may be, for example, the processor 140 of FIG. 1. The processor operates when the driving power is provided to the processor, and the processor ceases to operate when the driving power is not provided to the processor. The power management apparatus 200 may be included in the battery control apparatus or provided separately from the battery control apparatus.

The power providing unit 210 continuously receives a power supply from an external power source and provides the driving power to the processor. The power providing unit 210 may include a voltage regulator configured to regulate the voltage of the driving power that is input to the processor. The power providing unit 210 provides the driving power to the power providing unit 210 at the voltage regulated by the voltage regulator. The voltage regulator in the power providing unit 210 may be, for example, the voltage regulator 130 of FIG. 1.

The power controller 220 receives an input of a driving signal from an ignition switch to operate the processor. Based on the input of the driving signal, the power controller 220 controls providing of the driving power of the power providing unit 210.

In an example, the power controller 220 includes a first switch and a second switch. The power controller 220 may be located between the external power source and the power providing unit 210. The first switch switches the connection between the external power source and the power providing unit 210 on and off. The second switch controls the first switch based on an input of the driving signal. The first switch and the second switch may be, for example, the first switch 110 and the second switch 120 of FIG. 1, respectively.

To operate a driving vehicle including the power management apparatus 200, a user sets an ignition switch of the driving vehicle to an ON state. In the ON state, the ignition switch transmits the driving signal to at least one of the power controller 220 and the processor. While the driving signal is being received, the power controller 220 controls the power providing unit 210 to provide the driving power to the processor.

When the ignition switch is turned off, transmission of the driving signal to at least one of the power controller 220 and the processor is interrupted. When the driving signal is not received, the power controller 220 controls the power providing unit 210 to cease providing the driving power to the processor. Because the driving power input to the processor is cut off, no current exists between the processor and the power providing unit 210. Accordingly, a dark current is not generated in the battery control apparatus that includes the processor.

The processor could improperly terminate an operation if the power supplied to the processor is cut off by the power providing unit 210 immediately after the ignition switch is turned off. As a result of the immediate loss of power, the performance of the processor may be reduced, or the processor may be damaged or destroyed. To prevent this degradation in the performance of the processor, the power management apparatus 200 performs the power latch.

In an example, the processor may receive input of a driving signal from the ignition switch. To perform a power latch, the processor transmits a power latch signal to the power controller 220 during a period from a point in time when the driving power is input to the processor to a point in time when a predetermined period of time elapses after the input of the driving signal to the processor is interrupted. When the power latch signal is received, the power controller 220 controls the power providing unit 210 to provide the driving power to the processor even though the driving signal is no longer received. During the period from a point in time when the input of the driving signal is interrupted to a point in time while the processor transmits the power latch signal, the processor may terminate a program being processed by the processor.

In another example, when a predetermined period of time elapses after interruption of the input of the driving signal, the power controller 220 controls the power providing unit 210 to stop providing the driving power to the processor regardless of receiving the power latch signal. For example, the power management apparatus 200 may include a capacitor configured to provide power corresponding to the driving signal. When the driving signal is not input to the power controller 220, the capacitor provides power corresponding to the driving signal for a predetermined period of time. Accordingly, the power controller 220 controls the power providing unit 210 to provide the driving power to the processor during the predetermined period of time. When the predetermined period of time elapses, the power controller 220 controls the power providing unit 210 to stop providing the driving power to the processor.

Figure 3:
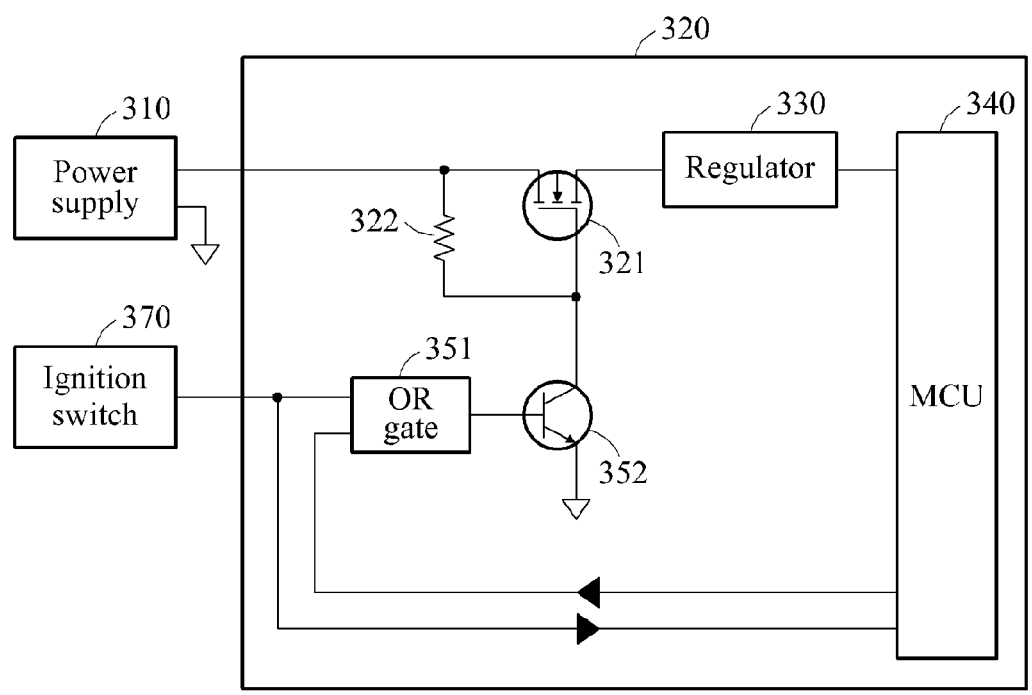
FIG. 3 is a block and circuit diagram illustrating an example of a battery control apparatus included in a battery system.

FIG. 3 illustrates an example of a battery control apparatus included in battery system 300.

As shown in FIG. 3, the battery system 300 includes a battery (not shown), a power supply 310, a battery control apparatus 320, and an ignition switch 370. The power supply 310 may be, for example, an external power source that continuously supplies a driving power to the battery control apparatus 320. In an example, the power supply 310 may provide a direct current (DC) power to the battery control apparatus 320. In another example, the power supply 310 may include an alternating current (AC)-to-DC (AC/DC) converter. In this example, the power supply 310 receives AC power from an external apparatus (not shown), converts the AC power to a DC power using the AC/DC converter, and provides the DC power to the battery control apparatus 320.

The ignition switch 370 is turned on and off to control ignition of a vehicle including the battery system 300. When the ignition switch 370 is in an ON state, the ignition is turned on. When the ignition switch 370 is in an OFF state, the ignition is turned off. The ignition switch 370 may be controlled based on an input from the external apparatus. In an example, when the external apparatus places the ignition switch 370 in the ON state, the ignition switch 370 transmits a driving signal to an OR gate 351 and an MCU 340. In another example, when the external apparatus places the ignition switch 370 in the OFF state, the ignition switch 370 does not transmit the driving signal to the OR gate 351 and the MCU 340.

The battery control apparatus 320 includes an FET 321, a resistor 322, a regulator 330, the MCU 340, the OR gate 351, and a BJT 352.

The FET 321 switches a connection between the power supply 310 and the regulator 330 on and off. The FET 321 may be, for example, one of a complementary metal-oxide-semiconductor (CMOS) transistor, an N-channel metal-oxide-semiconductor (NMOS) transistor and a P-channel metal-oxide-semiconductor (PMOS) transistor.

The BJT 352 is connected between the OR gate 351 and the FET 321 and controls a switching operation of the FET 321. In FIG. 3, the FET 321 and the BJT 352 are an NMOS transistor and an NPN transistor, respectively; however, the FET 321 and the BJT 352 are not limited thereto.

In an example, when the external apparatus places the ignition switch 370 in the ON state, the ignition switch 370 transmits the driving signal to the OR gate 351 and the MCU 340. In response to receiving the driving signal, the OR gate 351 outputs a signal to the base of the BJT 352. When the output signal is input to the base of the BJT 352, the BJT 352 is turned on, and the potential of the collector of the BJT 352 is equal to that of a ground. The gate of the FET 321 also has a potential equal to that of ground and; accordingly, a voltage is applied to the resistor 322. In this example, a source-gate voltage of the FET 321 becomes higher than the threshold voltage of the FET 321 and; accordingly, the FET 321 is turned on. When the FET 321 is turned on the power supply 310 is connected to the regulator 330.

When the power supply 310 and the regulator 330 are connected to each other, the regulator 330 receives power from the power supply 310. The regulator 330 may regulate a voltage of the power received from the power supply 310 that is input to the MCU 340, and the regulator 330 provides power at the regulated voltage to the MCU 340. The MCU 340 operates using the power received from the regulator 330. Additionally, the MCU 340 may receive the driving signal from the ignition switch 370. While the driving signal is being received, the MCU 340 transmits a power latch signal to the OR gate 351. The power latch signal is transmitted to perform a power latch having a power corresponding to the driving signal. While the OR gate 351 receives the power latch signal from the MCU 340 and the driving signal from the ignition switch 370, the OR gate 351 continuously transmits the output signal to the base of the BJT 352.

In another example, when the external apparatus places the ignition switch 370 in the OFF state, the ignition switch 370 stops transmitting the driving signal to the OR gate 351 and the MCU 340. Even though the driving signal is not received, the OR gate 351 continues to output a signal to the base of the BJT 352 because the power latch signal is received by the BJT 352 from the MCU 340.

When the driving signal is not received from the ignition switch 370, the MCU 340 may terminate a program being processed during a predetermined period of time. The predetermined period of time may be set in advance, or the MCU 340 may set the predetermined period of time as the period of time from a point in time when a reception of the driving signal is interrupted to a point in time when all programs are terminated.

When the predetermined period of time elapses, or when all programs processed by the MCU 340 are terminated, the MCU 340 stop transmitting the power latch signal to the OR gate 351. When both the driving signal and the power latch signal are not received by the OR gate 351, the OR gate 351 stops outputting a signal to the base of the BJT 352. In response to no output signal at the base of the BJT 352, the BJT 352 is turned off (or cut off). The collector of the BJT 352 is disconnected from the emitter of the BJT 352 and; accordingly, has a potential equal to that of the power supply 310. Also, the source and the gate of the FET 321 each have a potential equal to that of the power supply 310. In other words, there is no difference in potential between the source and the gate of the FET 321. The FET 321 may be turned off to disconnect the power supply 310 from the regulator 330. Accordingly, the power supplied by the power supply 310 is transferred to ground GND through the resistor 322 and the BJT 352. Additionally, current is blocked from flowing between the regulator 330 and the MCU 340; thus, dark current is prevented from being generated in the battery control apparatus 320.

Figure 4:
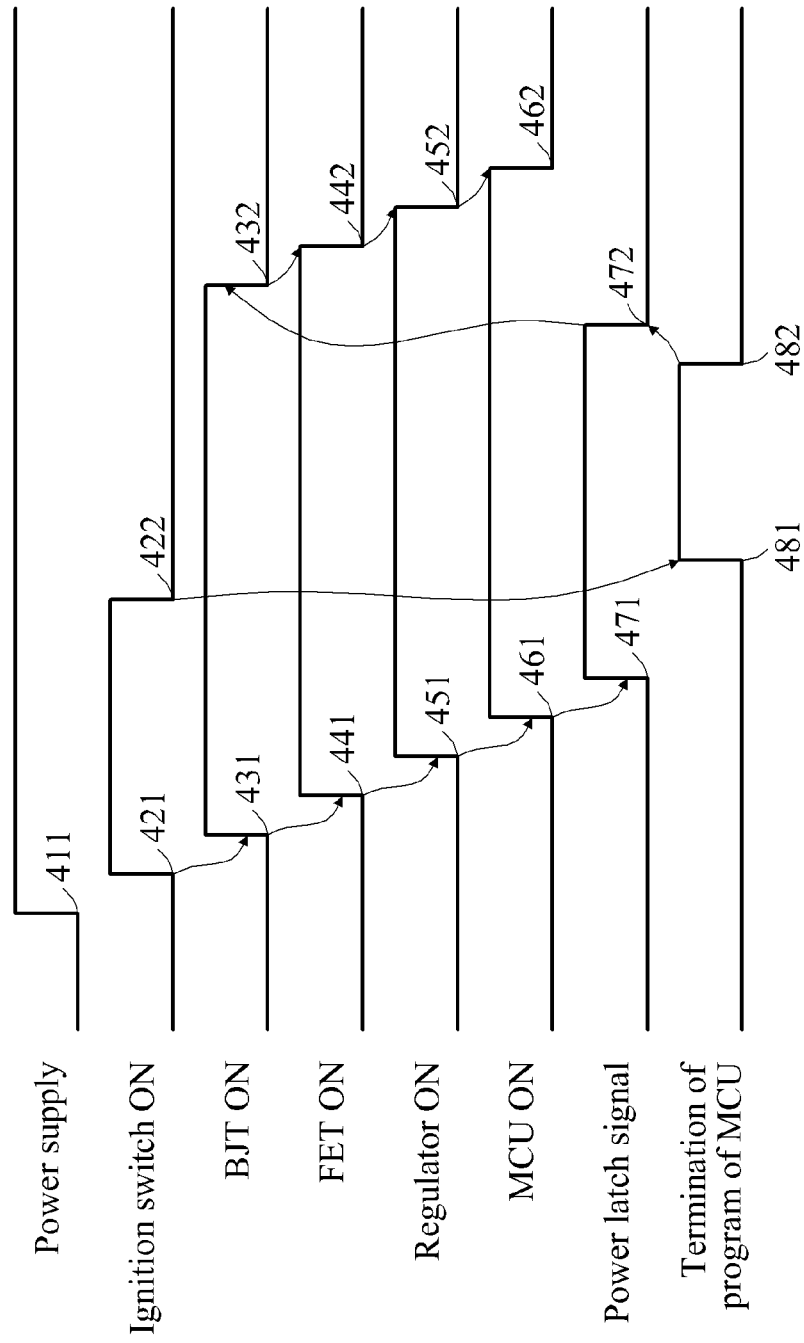
FIG. 4 illustrates an example of a timing chart based on the operation of the battery control apparatus of FIG. 3.

FIG. 4 illustrates an example of a time chart based on an operation of the battery control apparatus 320 of FIG. 3.

In the time chart shown in FIG. 4, the horizontal axis represents time, and the vertical axis represents whether an operation is performed (or whether a signal exists).

The power supply 310 continuously supplies power to the battery control apparatus 320 from a point in time 411.

The ignition switch 370 is in the ON state during the period from a point in time 421 to another point in time 422. The ignition switch is in the OFF state from the point in time 422 onward.

In the ON state, the ignition switch 370 transmits a driving signal to the OR gate 351 and the MCU 340. In response to the driving signal being received by the OR gate 351, the OR gate 351 transmits the output signal to the base of the BJT 352. In response to the output signal being received at the base of the BJT 352, the BJT 352 is turned on at the point in time 431 and causes the FET 321 to be placed in the ON state. The FET 321 is turned on by the BJT 352 at the point in time 441 connecting the power supply 310 to the regulator 330. The power supply 310 transmits power to the regulator 330 starting at the point in time 451. The regulator 330 regulates the voltage of the power received from the power supply 310 that is input to the MCU 340 and provides the power to the MCU 340 at the regulated voltage. The MCU 340 is operated at the point in time 461 the power from the regulator 330 is received. To perform a power latch, the MCU 340 transmits a power latch signal to the OR gate 351.

At the point in time 422, the ignition switch 370 is turned off and ceases to transmit the driving signal to the OR gate 351 and the MCU 340. In response to interruption of the of the driving signal at the point in time 422, the MCU 340 terminates a program being processed by the MCU 340 during the period from the point in time 481 to another point in time 482. The MCU 340 performs a process to terminate the program during the period from the point in time 481 to the point in time 482; accordingly, performance of the MCU 340 is maintained even though power is not supplied to the MCU 340. When the program is terminated, the MCU 340 ceases to transmit the power latch signal to the OR gate 351. In response to neither the driving signal nor the power latch signal being received, the OR gate 351 stops transmitting the output signal to the base of the BJT 352; accordingly, the BJT 352 is turned off at the point in time 432. When the BJT 352 is turned off, the FET 321 is turned off at the point in time 442, and the power supply 310 is disconnected from the regulator 330. The regulator 330 interrupts the supply of power to the MCU 340 at the point in time 452, and the MCU 340 interrupts the operation of the MCU 340 at the point in time 462. Accordingly, current does not flow between the regulator 330 and the MCU 340, and dark current is prevented from being generated in the battery control apparatus 320.

FIGS. 5 through 8 illustrate examples of a battery control apparatus that may be included in battery systems.

Figure 5:
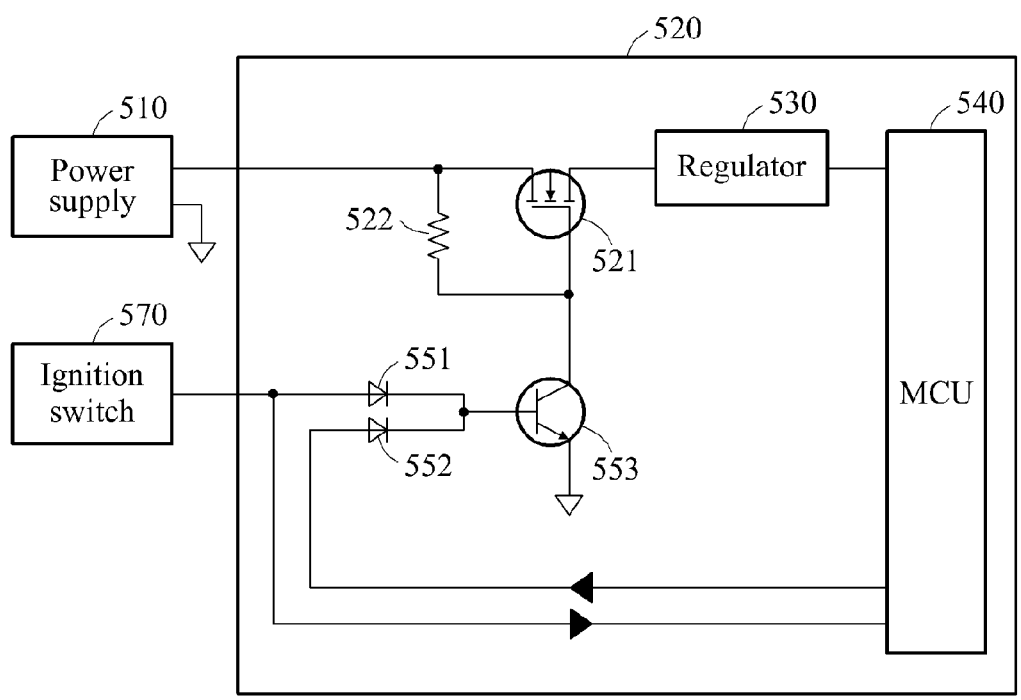
FIGS. 5, 6, 7, and 8 are block and circuit diagrams illustrating examples of a battery control apparatus included in a battery system.

As shown in FIG. 5, a battery system 500 includes a battery (not shown), a power supply 510, a battery control apparatus 520, and an ignition switch 570. The power supply 510 may be, for example, an external power source to continuously to supply a driving power (for example, a DC power) to the battery control apparatus 520.

The ignition switch 570 is turned on and off to control an ignition of a vehicle including the battery system 500. In an example, when the ignition switch 570 is in an ON state, the ignition is turned on, and the ignition switch 570 transmits a driving signal to a first diode 551 and an MCU 540. In another example, when the ignition switch 570 is in an OFF state, the ignition is turned off, and the ignition switch 570 does not transmit the driving signal to the first diode 551 and the MCU 540.

The battery control apparatus 520 includes an FET 521, a resistor 522, a regulator 530, the MCU 540, the first diode 551, a second diode 552, and a BJT 553.

The FET 521 switches a connection between the power supply 510 and the regulator 530 on and off.

The BJT 553 controls a switching operation of the FET 521. As shown in FIG. 5, the FET 521 and the BJT 553 are an NMOS transistor and an NPN transistor, respectively; however, the FET 521 and the BJT 553 are not limited thereto.

The first diode 551 receives an input of the driving signal from the ignition switch 570 and transfers the driving signal to the BJT 553. The second diode 552 receives an input of a power latch signal from the MCU 540 and transfers the power latch signal to the BJT 553. The first diode 551 and the second diode 552 may correspond to, for example, the OR gate 351 shown in FIG. 3. In FIG. 5, the first diode 551 and the second diode 552 are rectification diodes; however, the first diode 551 and the second diode 552 are not limited thereto. For example, the first diode 551 and the second diode 552 may be a Zener diode, a variable capacitance diode, a voltage variable resistor diode, a switching diode, a Schottky barrier diode, a band switching diode, a tunnel diode, an impact avalanche transit-time (IMPATT) diode, a Gunn diode, and a PIN diode.

In an example, when an external apparatus controls the ignition switch 570 to be in the on state, the ignition switch 570 transmits the driving signal to the first diode 551 and the MCU 540. In response to the driving signal being received, the first diode 551 outputs the driving signal to the base of the BJT 553. When the driving signal is input to the base of the BJT 553, the BJT 553 is turned on and the potential of the collector of the BJT 553 equals ground. The potential of the gate of the FET 521 also equals ground; accordingly, a voltage is applied to the resistor 522. As the source-gate voltage of the FET 521 becomes higher than the threshold voltage of the FET 521; accordingly, the FET 521 is turned on and connects the power supply 510 to the regulator 530. When the power supply 510 and the regulator 530 are connected to each other, the regulator 530 receives power from the power supply 510. The regulator 530 regulates the voltage of the power received from the power supply 510 that is input to the MCU 540, and the regulator 530 provides power with a regulated voltage to the MCU 540. The MCU 540 operates using the power received from the regulator 530. Additionally, the MCU 540 receives the driving signal from the ignition switch 570. While the driving signal is received, the MCU 540 transmits the power latch signal to the second diode 552, and the second diode 552 transfers the power latch signal to the BJT 553.

In another example, when the external apparatus controls the ignition switch 570 to be in the OFF state, the ignition switch 570 stops transmitting the driving signal to the first diode 551 and the MCU 540. When the first diode 551 ceases to transfer the driving signal to the BJT 553, the BJT 553 still receives the power latch signal from the second diode 552. Accordingly, a predetermined voltage continues to be generated at the collector of the BJT 553, and the FET 521 remains in the on state.

When the driving signal is not received from the ignition switch 570, the MCU 540 terminates a program being processed within a predetermined period of time. When the predetermined period of time elapses, or when all programs processed by the MCU 540 are terminated, the MCU 540 stops transmitting the power latch signal to the second diode 552, and the second diode 552 ceases to transfer the power latch signal to the BJT 553. Because the second diode 552 does not transfer the power latch signal, the driving signal and the power latch signal are not input to the base of the BJT 553. As a result, the base of the BJT 553 is turned off, and the BJT 553 also is turned off. The collector of the BJT 553 is disconnected from the emitter of the BJT 553; accordingly, the potential of the collector is equal to that of the power supply 510. Also, the source and the gate of the FET 521 each have a potential equal to that of the power supply 510. In other words, there is no difference in the potential between the source and the gate of the FET 521. The FET 521 is turned off to disconnect the power supply 510 from the regulator 530. Accordingly, the power supplied by the power supply 510 is transferred to ground GND through the resistor 522 and the BJT 553. Additionally, current is prevented from flowing between the regulator 530 and the MCU 540; thus, no dark current is generated in the battery control apparatus 520.

Figure 6:
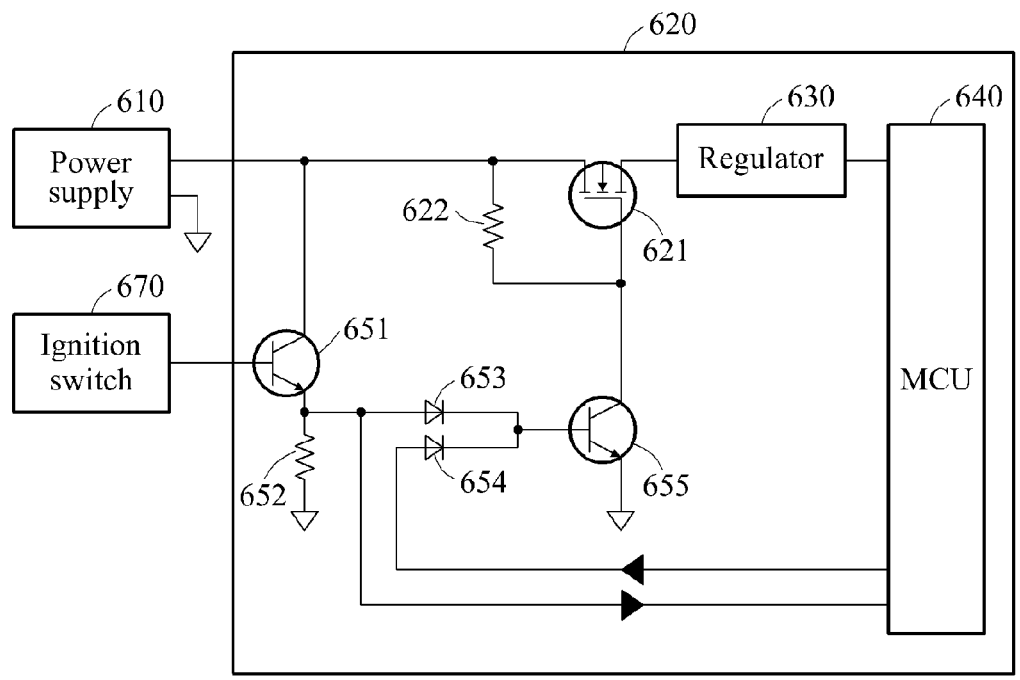

Referring to FIG. 6, a battery system 600 includes a battery, a power supply 610, a battery control apparatus 620, and an ignition switch 670. The power supply 610 may be, for example, an external power source to continuously supply a driving power (for example, a DC power) to the battery control apparatus 620.

The ignition switch 670 is turned on and off to control an ignition of a vehicle including the battery system 600. In an example, when the ignition switch 670 is in an ON state, the ignition may be turned on, and the ignition switch 670 transmits a driving signal to a first BJT 651 and an MCU 640. In another example, when the ignition switch 670 is in an OFF state, the ignition may be turned off, and the ignition switch 670 does not transmit the driving signal to the first BJT 651 and the MCU 640

The battery control apparatus 620 includes an FET 621, a first resistor 622, a regulator 630, the MCU 640, the first BJT 651, a second resistor 652, a first diode 653, a second diode 654, and a second BJT 655.

The FET 621 switches a connection between the power supply power supply 610 and the regulator 630 on and off.

The driving signal from the ignition switch 670 is input to the first BJT 651, and the first BJT 651 transfers the driving signal to the first diode 653.

The second BJT 655 controls a switching operation of the FET 621. As shown in FIG. 6, the FET 621 is an NMOS transistor, and the first BJT 651 and the second BJT 655 are NPN transistors; however, the FET 621, the first BJT 651, and the second BJT 655 are not limited thereto.

The first diode 653 receives an input of the driving signal from the first BJT 651 and transfers the driving signal to the second BJT 655. The second diode 654 receives an input of a power latch signal from the MCU 640 and transfers the power latch signal to the second BJT 655. The first diode 653 and the second diode 654 may correspond to, for example, the OR gate 351 of FIG. 3. As shown in FIG. 6, the first diode 653 and the second diode 654 are rectification diodes; however, the first diode 653 and the second diode 654 are not limited thereto.

In an example, when an external apparatus controls the ignition switch 670 to be in the ON state, the ignition switch 670 transmits the driving signal to the first BJT 651 and the MCU 640.

The first BJT 651 is turned on in response to the driving signal being received at the base of the first BJT 651, and the first BJT 651 outputs a current corresponding to the driving signal to the emitter of the first BJT 651. The current is transmitted from the emitter to the first diode 653, and the first diode 653 transfers the current to the second BJT 655.

While the current is input to the base of the second BJT 655, the second BJT 655 is turned on, and the potential of the collector of the second BJT 655 is equal to that of ground. Also, the potential of the gate of the FET 621 equals that of the ground; accordingly, a voltage is applied to the first resistor 622. As the source-gate voltage of the FET 621 becomes higher than the threshold voltage of the FET 621; accordingly, the FET 621 is turned on connecting the power supply 610 to the regulator 630.

When the power supply 610 and the regulator 630 are connected to each other, the regulator 630 receives power from the power supply 610. The regulator 630 regulates the voltage of the power received from the power supply 610 that is input to the MCU 640. The regulator 630 provides the power with the regulated voltage to the MCU 640. The MCU 640 operates using the power received from the regulator 630. Additionally, the MCU 640 receives the driving signal from the ignition switch 670. While the driving signal is being received, the MCU 640 transmits the power latch signal to the second diode 654, and the second diode 654 transfers the power latch signal to the second BJT 655.

In another example, when the external apparatus controls the ignition switch 670 to be in the OFF state, the ignition switch 670 ceases to transmit the driving signal to the first BJT 651 and the MCU 640. The first BJT 651 may be turned off (or cut off) with no current output from the emitter of the first BJT 651 in response to the loss of input of the driving signal at the base of the first BJT 651. The first diode 653 stops transmitting the current to the second BJT 655 in response to the lack of current being received from the emitter of the first BJT 651. However, the second BJT 655 continues to receive the power latch signal from the second diode 654. Accordingly, a predetermined voltage continues to be generated at the collector of the second BJT 655, and the FET 621 remains in the on state.

When the driving signal is not received from the ignition switch 670, the MCU 640 terminates a program being processed by the MCU 640 within a predetermined period of time. When the predetermined period of time elapses, or when all programs processed by the MCU 640 are terminated, the MCU 640 stops transmitting the power latch signal to the second diode 654, and the power latch signal is not transferred from the second diode 654 to the second BJT 655. Because the second diode 654 does not transfer the power latch signal, the driving signal and the power latch signal are not input to the base of the second BJT 655. As a result, the base of the second BJT 655 is turned off, and the second BJT 655 also is turned off. The collector of the second BJT 655 is disconnected from the emitter of the second BJT 655; accordingly, the potential of the collector is equal to that of the power supply 610. Also, the source and the gate of the FET 621 each have a potential equal to that of the power supply 610. In other words, there is no difference in the potential between the source and the gate of the FET 621. The FET 621 is turned off disconnecting the power supply 610 from the regulator 630. Accordingly, the power supplied by the power supply 610 is transferred to a ground GND through the first resistor 622 and the second BJT 655. Additionally, current is prevented from flowing between the regulator 630 and the MCU 640; thus, no dark current is generated in the battery control apparatus 620.

Figure 7:
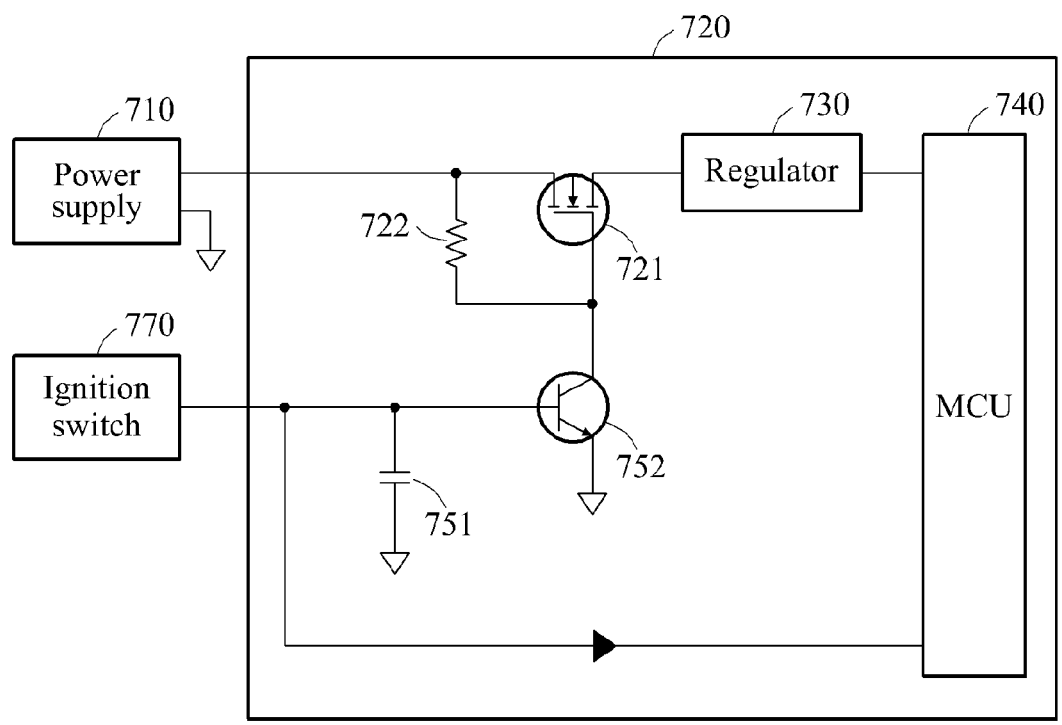

As shown in FIG. 7, a battery system 700 includes a battery (not shown), a power supply 710, a battery control apparatus 720, and an ignition switch 770. The power supply 710 may be, for example, an external power source to continuously supply a driving power (for example, a DC power) to the battery control apparatus 720.

The ignition switch 770 is turned on and off to control the ignition of a vehicle including the battery system 700. In an example, when the ignition switch 770 is in an ON state, the ignition may be turned on, and the ignition switch 770 transmits a driving signal to a BJT 752 and an MCU 740. In another example, when the ignition switch 770 is in an OFF state, the ignition may be turned off, and the ignition switch 770 does not transmit the driving signal to the BJT 752 and the MCU 740.

The battery control apparatus 720 includes an FET 721, a resistor 722, a regulator 730, the MCU 740, a capacitor 751, and the BJT 752.

The FET 721 switches a connection between the power supply 710 and the regulator 730 on and off.

The BJT 752 controls a switching operation of the FET 721. As shown in FIG. 7, the FET 721 and the BJT 752 are an NMOS transistor and an NPN transistor, respectively: however, the FET 721 and the BJT 752 are not limited thereto.

In an example, when an external apparatus controls the ignition switch 770 to be in the ON state, the ignition switch 770 transmits the driving signal to the BJT 752 and the MCU 740. The BJT 752 is turned on in response to the driving signal being input to the base of the BJT 752, and the potential of the collector of the BJT 752 is equal to that of ground. Also, the potential of the gate of the FET 721 is equal to that of the ground; accordingly, a voltage is applied to the resistor 722. When the source-gate voltage of the FET 721 becomes higher than the threshold voltage of the FET 721, the FET 721 is turned on connecting the power supply 710 to the regulator 730.

When the power supply 710 and the regulator 730 are connected to each other, the regulator 730 receives power from the power supply 710. The regulator 730 regulates the voltage of the power received from the power supply 710 that is input to the MCU 740, and the regulator 730 provides the power with the regulated voltage to the MCU 740. The MCU 740 operates using the power received from the regulator 730. Additionally, the MCU 740 receives the driving signal from the ignition switch 770.

In another example, when the external apparatus controls the ignition switch 770 to be in the OFF state, the ignition switch 770 stops transmitting the driving signal to the BJT 752 and the MCU 740. In this example, although the driving signal is not input to the emitter of the BJT 752, the capacitor 751 transmits a current corresponding to the driving signal to the emitter of the BJT 752 for a predetermined period of time. The capacitor 751 may have a capacity enabling the transmission of the current corresponding to the driving signal for the predetermined period of time. Accordingly, a predetermined voltage continues to be generated at the collector of the BJT 752, and the FET 721 remains in the ON state. The predetermined period of time is set in advance. For example, an average period of time required for a processing of the MCU 740 may be calculated in advance, and the capacitor 751 stores power corresponding to the calculated period of time.

When the driving signal ceases to be received from the ignition switch 770, the MCU 740 may terminate a program being processed by the MCU 740 within the predetermined period of time.

When the predetermined period of time elapses, the capacitor 751 stops transferring current corresponding to the driving signal to the BJT 752. The base of the BJT 752 is turned off in response to the lack of current input to the BJT 752, and the BJT 752 is turned off. The collector of the BJT 752 is disconnected from the emitter of the BJT 752; accordingly, the potential of the collector of the BJT 752 is equal to that of the power supply 710. Also, the potential of the source and the gate of the FET 721 are each equal to that of the power supply 710. In other words, there is no difference in potential between the source and the gate of the FET 721. The FET 721 is turned off disconnecting the power supply 710 from the regulator 730. Accordingly, the power supplied by the power supply 710 is transferred to a ground GND through the resistor 722 and the BJT 752. Additionally, current is prevented from flowing between the regulator 730 and the MCU 740; thus, no dark current is generated in the battery control apparatus 720.

Figure 8:
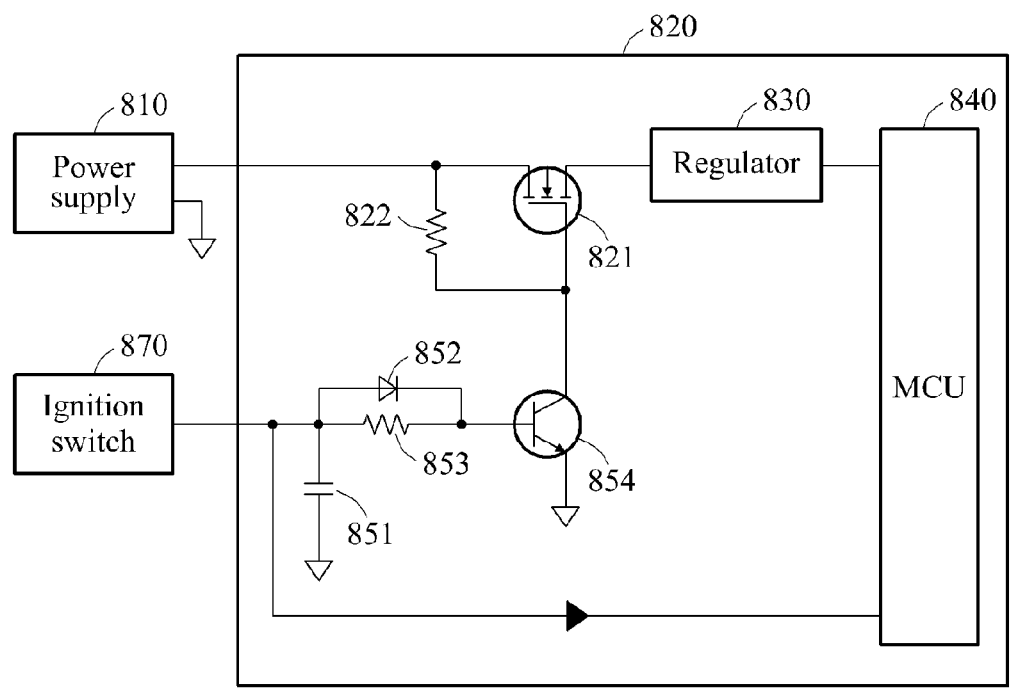

As shown in FIG. 8, a battery system 800 includes a battery (not shown), a power supply 810, a battery control apparatus 820, and an ignition switch 870. The power supply 810 may be, for example, an external power source to continuously supply a driving power (for example, a DC power) to the battery control apparatus 820.

The ignition switch 870 is turned on and off to control an ignition of a vehicle including the battery system 800. In an example, when the ignition switch 870 is in an ON state, the ignition may be turned on, and the ignition switch 870 transmits a driving signal to a BJT 854 and an MCU 840. In another example, when the ignition switch 870 is in an OFF state, the ignition may be turned off, and the ignition switch 870 does not transmit the driving signal to the BJT 854 and the MCU 840.

The battery control apparatus 820 includes an FET 821, a first resistor 822, a regulator 830, the MCU 840, a capacitor 851, a diode 852, a second resistor 853, and the BJT 854.

The FET 821 switches a connection between the power supply 810 and the regulator 830 on and off.

The BJT 854 controls a switching operation of the FET 821. As shown in FIG. 8, the FET 821 and the BJT 854 are an NMOS transistor and an NPN transistor, respectively, however, the FET 821 and the BJT 854 are not limited thereto.

The diode 852 is connected between the BJT 854 and the capacitor 851. The diode 852 transfers the driving signal or a current, corresponding to the driving signal, to the BJT 854. The second resistor 853 is connected in parallel to the diode 852.

In an example, when an external apparatus controls the ignition switch 870 to be in the ON state, the ignition switch 870 transmits the driving signal to the diode 852 and the MCU 840. The driving signal is input to the diode 852, and the diode 852 transfers the driving signal to the base of the BJT 854. The BJT 854 is turned on in response to the driving signal being received at the base of the BJT 854, and the potential at the collector of the BJT 854 equals ground. Also, the potential of the gate of the FET 821 equals that of the ground; accordingly, a voltage is applied to the first resistor 822. When the source-gate voltage of the FET 821 becomes higher than the threshold voltage of the FET 821, the FET 821 is turned on connecting the power supply 810 to the regulator 830.

When the power supply 810 and the regulator 830 are connected to each other, the regulator 830 receives power from the power supply 810. The regulator 830 regulates the voltage of the power received from the power supply 810 that is input to the MCU 840. The regulator 830 provides power with the regulated voltage to the MCU 840. The MCU 840 operates using the power received from the regulator 830. Additionally, the MCU 840 receives the driving signal from the ignition switch 870.

In another example, when the external apparatus controls the ignition switch 870 to be in the OFF state, the ignition switch 870 cease to transmit the driving signal to the diode 852 and the MCU 840, and the diode 852 ceases to transfer the driving signal to the BJT 854. In this example, the capacitor 851 may transmit a current corresponding to the driving signal to the diode 852 for a predetermined period of time, and the diode 852 transfers the received current to the base of the BJT 854. Accordingly, a predetermined voltage may continue to be generated at the collector of the BJT 854 allowing the FET 821 to remain in the ON state. The predetermined period of time is set in advance.

When the driving signal is not received from the ignition switch 870, the MCU 840 may terminate a program being processed by the MCU 840 during a predetermined period of time. When the predetermined period of time elapses, the capacitor 851 stops transferring the current to the diode 852, and the diode 852 does not input any current to the BJT 854. The base of the BJT 854 is turned off in response to the lack of current being input to the BJT 854. The collector of the BJT 854 is disconnected from the emitter of the BJT 854; accordingly, the potential of the collector equals that of the power supply 810. Also, the potential of the source and the gate of the FET 821 are equal to that of the power supply 810. In other words, there is no difference in potential between the source and the gate of the FET 821. The FET 821 is turned off disconnecting the power supply 810 from the regulator 830. Accordingly, the power supplied by the power supply 810 is transferred to a ground GND through the first resistor 822 and the BJT 854. Additionally, current is prevented from flowing between the regulator 830 and the MCU 840; thus, no dark current is generated in the battery control apparatus 820.

Figure 9:
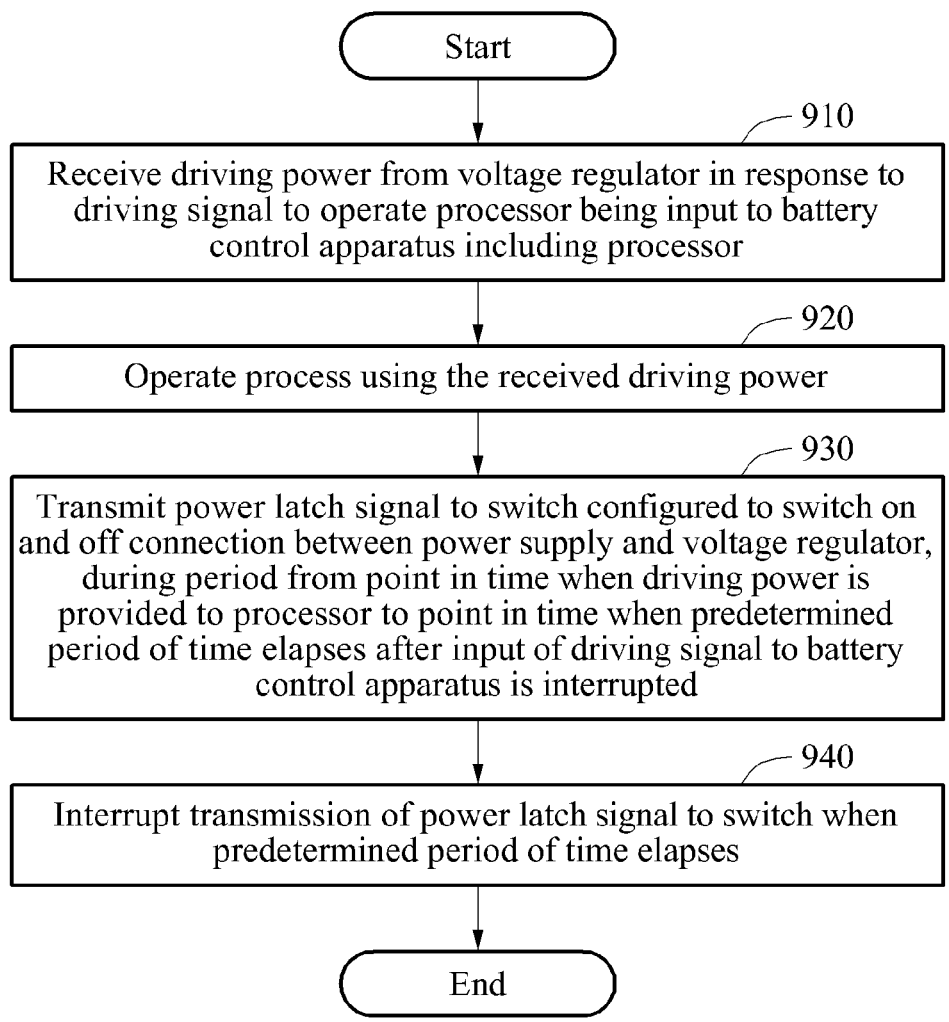
FIG. 9 is a flowchart illustrating an example of a method of controlling a processor.

FIG. 9 illustrates an example of a method of controlling a processor.

Referring to FIG. 9, in operation 910, the processor receives a driving power from a voltage regulator in response to a driving signal to operate the processor being input to a battery control apparatus including the processor.

In operation 920, the processor is operated using the received driving power.

In operation 930, the processor transmits a power latch signal to a switch during a period from a point in time when the driving power is provided to the processor to a point in time when a predetermined period of time elapses after an input of the driving signal to the battery control apparatus is interrupted. The switch is configured to switch a connection between a power supply and the voltage regulator on and off.

In an example, the processor receives an input of a driving signal and operates while the input of the driving signal is being received. The processor transmits a power latch signal to the switch during a period from a point in time when the processor starts to operate to a point in time when a predetermined period of time elapses after an input of the driving signal to the battery control apparatus is interrupted. While at least one of the driving signal and the power latch signal is being received, the switch connects the power supply to the voltage regulator.

When the input of the driving signal to the battery control apparatus is interrupted, the switch does receive the input of the driving signal but receives the power latch signal from the processor for the predetermined period of time. In response to the power latch signal being received, the switch continues to connect the power supply to the voltage regulator.

The processor may terminate a program being processed by the processor during the predetermined period of time. Accordingly, the processor is stably terminated preventing performance of the processor from being degraded. Additionally, the processor may set the predetermined period of time to be equal to or longer than a period of time required to terminate the program. In addition, the predetermined period of time may be set in advance.

In operation 940, the processor interrupts the transmission of the power latch signal to the switch when the predetermined period of time elapses. When the power latch signal ceases to be input to the switch, the switch cuts the connection between the power supply and the voltage regulator, and the processor ceases to receive the driving power from the voltage regulator. As a result, operation of the processor is terminated.

In another example, when the driving signal ceases to be input to the processor, the processor transmits a control signal to the switch. The control signal causes the switch to cut the connection between the power supply and the voltage regulator after the predetermined period of time elapses. In response to the control signal being received, the switch cuts the connection between the power supply and the voltage regulator preventing the processor from receiving the driving power from the voltage regulator.

The description associated with FIGS. 1 through 8 is equally be applicable to the method of FIG. 9; accordingly, the description is not repeated here.

The units described herein may be implemented using one or more hardware components, and/or hardware components implementing one or more software components. For example, the hardware components may include switches, resistors, diodes, transistors, capacitors, power supplies, batteries, voltage regulators, and processing devices. A processing device may be implemented using one or more general-purpose or special purpose computers, such as, for example, a processor, a controller, a microcontroller, an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as processors operating in parallel.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

The above described systems, devices and methods are described in connection with a vehicle; however, the system, devices, and method also may be used in connection with other devices using a power supply. As a non-exhaustive illustration only, other devices may include to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of being connected to a power supply.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A battery control apparatus comprising:
a processor;
a voltage regulator including an input and an output, the voltage regulator configured to receive power supplied from a power supply at the input, regulate the voltage of the power, and provided the regulated voltage to the output to power the processor;
a first switch having a first state connecting the input of the voltage regulator to receive the power from the power supply and a second state disconnecting the input of the voltage regulator from the power supply to cut off the power from the input to the voltage regulator; and
a second switch having an output connected to the first switch, the second switch configured to turn on based on a driving signal for operating the processor, and provide a control signal to the first switch to place the first switch in the one of the first state or the second state,
wherein, in response to the second switch not receiving the driving signal, the second switch continues to turn on during a predetermined time based on either one or both of a power latch signal from the processor and an electrical signal corresponding to a power stored in a capacitor,
wherein the second switch comprises:
an OR gate configured to transmit an output signal when receiving at least one of the driving signal and the power latch signal; and
a transistor connected between the OR gate and the first switch, the transistor configured to place the first switch in the first state in response to the output signal provided from the OR gate.

2. The battery control apparatus of claim 1, wherein the first switch comprises:
a transistor connected to the second switch, the transistor being located between the power supply and the voltage regulator; and
a resistor connected in parallel to the transistor.

3. The battery control apparatus of claim 1, wherein the second switch includes an input configured to receive a power latch signal from the processor and a driving signal from the power supply and to output the control signal to place the first switch in the first state in response to receiving at least one of the driving signal and the power latch signal.

4. The battery control apparatus of claim 1, wherein the second switch comprises:
a transistor having an input, the transistor configured to receive a current at the input and place the first switch in the first state when the input receives the current and to place the first switch in the second state when the input stops receiving the current; and
a capacitor configured to provide the current to the transistor for a predetermined period of time after the driving signal stops being transmitted to the second switch,
wherein, the current provided to the transistor corresponds to the current provided by the driving signal.

5. The battery control apparatus of claim 3, wherein the second switch is configured to stop output of the control signal and place the first switch in the second state once a predetermined period of time elapses after the second switch ceases to receive the driving signal.

6. The battery control apparatus of claim 3, wherein the second switch comprises:
a first diode having an input and an output, the first diode configured transfer the driving signal received at the input of the first diode to the output of the first diode;
a second diode having an input and an output, the second diode configured to transfer the power latch signal received at the input of the second diode to the output of the second diode; and
a first transistor, connected to the output of the first diode and the output of the second diode, the first transistor configured to place the first switch in the first state and the second state, wherein the first transistor places the first switch in the second state when neither the driving signal is output from the first diode, nor the power latch signal is output from the second diode.

7. The battery control apparatus of claim 4, wherein the capacitor has a capacity enabling the capacitor to provide the current to the transistor for the predetermined period of time.

8. The battery control apparatus of claim 4, wherein the second switch further comprises:
a diode, connected between the transistor and the capacitor, configured to transfer the driving signal and the current from the capacitor to the transistor; and
a resistor connected in parallel to the diode.

9. The battery control apparatus of claim 5, wherein the processor is configured to transmit the power latch signal to the second switch when the driving signal is not input to the processor for a period of time, the period of time being from a point in time when the driving power is provided to the processor to a point in time when the predetermined period of time elapses.

10. The battery control apparatus of claim 5, wherein the processor is configured to terminate a program being processed by the processor during the predetermined period of time.

11. The battery control apparatus of claim 6, wherein the second switch comprises a second transistor comprising an input configured to receive the driving signal and an output connected to the first diode, the second transistor configured to transfer the driving signal received at the input to the output.

12. The battery control apparatus of claim 9, wherein the processor is configured to stop transmitting the power latch signal to the second switch, and the second switch is configured to place the first switch in the second state after the predetermined period of time elapses when the second switch stops receiving the driving signal and the power latch signal.

13. The battery control apparatus of claim 10, wherein the processor is configured to set the predetermined period of time to be equal to or longer than a period of time required to terminate the program.

14. A power management apparatus comprising:
a power providing unit configured to provide a driving power to a processor; and
a power controller configured to control providing of the driving power by the power providing unit based on receiving an input of a driving signal to operate the processor,
wherein the power controller comprises a first switch configured to connect a voltage regulator to the power providing unit and a second switch configured to turn on based on the driving signal, and
wherein, in response to the second switch not receiving the driving signal, the second switch continues to turn on during a predetermined time based on either one or both of a power latch signal from the processor and an electrical signal corresponding to a power stored in a capacitor,
wherein the second switch comprises:
an OR gate configured to transmit an output signal when receiving at least one of the driving signal and the power latch signal; and
a transistor connected between the OR gate and the first switch, the transistor configured to place the first switch in the first state in response to the output signal provided from the OR gate, the first state connecting the voltage regulator to receive the power from the power providing unit.

15. The power management apparatus of claim 14, wherein the power providing unit comprises a voltage regulator configured to regulate a voltage of the driving power input to the processor.

16. The power management apparatus of claim 14, wherein the power providing unit is configured to provide the driving power to the processor in response to receiving at least one of an input of a power latch signal from the processor and the input of the driving signal.

17. The power management apparatus of claim 14, wherein the power controller is configured to control the power providing unit to stop providing the driving power to the processor when a predetermined period of time elapses after the power controlling unit stops receiving input of the driving signal.

18. The power management apparatus of claim 14, wherein the predetermined period of time corresponds to the time need by the processor to terminate a program being processed by the processor.

19. The power management apparatus of claim 17, wherein the power controller is configured to receive an input of the power latch signal from the processor during the predetermined period of time after power controlling unit stops receiving input of the driving signal and control the power providing unit to stop providing the driving power to the processor when the input of the power latch signal is terminated.

20. A method of controlling a processor, the method comprising:
receiving a driving power from a voltage regulator in response to a driving signal to operate the processor being input to a battery control apparatus comprising the processor, the voltage regulator is connected to a power supply via a first switch;
operating the processor using the received driving power;
transmitting a power latch signal to a second switch during a period from a point in time when the driving power is provided to the processor to a point in time when a predetermined period of time elapses after the input of the driving signal to the battery control apparatus is interrupted, the second switch being configured to maintain a connection between a power supply and the voltage regulator in response to receiving at least one of the driving signal and the power latch signal; and
interrupting transmission of the power latch signal to the second switch in response to the predetermined period of time elapsing,
wherein, in response to the second switch not receiving the driving signal, the second switch continues to turn on during a predetermined time based on either one or both of a power latch signal from the processor and an electrical signal corresponding to a power stored in a capacitor,
wherein the second switch comprises:
an OR gate configured to transmit an output signal when receiving at least one of the driving signal and the power latch signal; and
a transistor connected between the OR gate and the first switch, the transistor configured to place the first switch in the first state in response to the output signal provided from the OR gate, the first state connecting the voltage regulator to receive the power from the power supply.

21. The method of claim 20, further comprising:
preventing any power consumption by the processor in response to interruption of transmission of the power signal.

22. The method of claim 20, further comprising:
stop receiving the driving power from the voltage regulator to operate the processor from being input to a battery control apparatus comprising the processor; and
stop operating the processor.

23. The method of claim 20, further comprising:
terminating a program being processed by the processor during the predetermined period of time.

24. The method of claim 23, further comprising:
setting the predetermined period of time to be equal to or longer than a period of time required to terminate the program.

* * * * *